United States Patent
Li et al.

(10) Patent No.: US 12,204,878 B2
(45) Date of Patent: Jan. 21, 2025

(54) RESOURCE FILE LOADING METHOD, APPARATUS, ELECTRONIC DEVICE AND STORAGE MEDIUM

(71) Applicant: BEIJING ZITIAO NETWORK TECHNOLOGY CO., LTD., Beijing (CN)

(72) Inventors: Yu Li, Beijing (CN); Jing Wang, Beijing (CN); Boyuan Hu, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 81 days.

(21) Appl. No.: 18/055,222

(22) Filed: Nov. 14, 2022

(65) Prior Publication Data
US 2023/0205494 A1 Jun. 29, 2023

(30) Foreign Application Priority Data
Dec. 29, 2021 (CN) .......................... 202111636944.4

(51) Int. Cl.
*G06F 16/955* (2019.01)
*G06F 8/33* (2018.01)
(Continued)

(52) U.S. Cl.
CPC .............. *G06F 8/33* (2013.01); *G06F 8/71* (2013.01); *G06F 16/152* (2019.01); *G06F 16/955* (2019.01); *G06F 16/957* (2019.01)

(58) Field of Classification Search
CPC . G06F 8/33; G06F 8/71; G06F 16/152; G06F 16/957; G06F 16/955
See application file for complete search history.

(56) References Cited

U.S. PATENT DOCUMENTS

| 10,666,708 B1 * | 5/2020 | Gavalas ................. H04L 67/06 |
| 2006/0100973 A1 * | 5/2006 | McMaster ............... G06F 9/454 |

(Continued)

FOREIGN PATENT DOCUMENTS

| CN | 109513212 A | 3/2019 |
| CN | 112379944 A | 2/2021 |

(Continued)

OTHER PUBLICATIONS

Timo Luukkonen, Resource Management in Game Engine Development, 2015, [Retrieved on Sep. 12, 2024]. Retrieved from the internet: <URL: https://www.theseus.fi/bitstream/handle/10024/101246/Luukkonen_Timo.pdf;sequence=1> 38 Pages (1-38) (Year: 2015).*

*Primary Examiner* — Anibal Rivera (57) ABSTRACT

The present application relates to a resource file loading method, apparatus, electronic device and storage medium, which are applied in the field of Internet technology. The method includes: acquiring an editable first resource file, storing the first resource file and cache data of the first resource file; wherein the cached data is un-editable, and the file size of the cached data is smaller than that of the first resource file; in response to a loading instruction for the first resource file, determining whether the first resource file has changed; if the first resource file has not changed, acquiring the cached data of the first resource file and loading the cached data of the first resource file; if the first resource file has changed, acquiring the first resource file and loading the first resource file.

20 Claims, 4 Drawing Sheets

(51) Int. Cl.
   *G06F 8/71*    (2018.01)
   *G06F 16/14*   (2019.01)
   *G06F 16/957*  (2019.01)

(56) References Cited

U.S. PATENT DOCUMENTS

| | | | |
|---|---|---|---|
| 2012/0159260 A1* | 6/2012 | Fortune | G06F 9/454 |
| | | | 714/38.1 |
| 2014/0359423 A1 | 12/2014 | Doan et al. | |
| 2017/0310753 A1* | 10/2017 | Knothe | H04L 67/02 |
| 2018/0041590 A1* | 2/2018 | Ma | G06F 16/958 |
| 2019/0212987 A1 | 7/2019 | Okamura | |
| 2021/0073013 A1* | 3/2021 | Burukhin | G06F 9/454 |
| 2021/0271640 A1* | 9/2021 | Du | G06F 16/172 |
| 2021/0344741 A1* | 11/2021 | Chen | H04L 67/06 |
| 2023/0351050 A1* | 11/2023 | Tu | G06F 21/64 |
| 2023/0376459 A1* | 11/2023 | Wang | G06F 16/957 |
| 2024/0037164 A1* | 2/2024 | Wang | G06F 3/0483 |

FOREIGN PATENT DOCUMENTS

| | | |
|---|---|---|
| CN | 112506584 A | 3/2021 |
| CN | 113296778 A | 8/2021 |

\* cited by examiner

RESOURCE FILE LOADING METHOD, APPARATUS, ELECTRONIC DEVICE AND STORAGE MEDIUM

CROSS-REFERENCE TO RELATED APPLICATION

The present application claims priority to P.R.C. patent application No. 202111636944.4, filed Dec. 29, 2021, and entitled "RESOURCE FILE LOADING METHOD, APPARATUS, ELECTRONIC DEVICE AND STORAGE MEDIUM", the entirety of which is incorporated herein by reference.

TECHNICAL FIELD

The present application relates to the field of Internet technologies, and in particular, to a resource file loading method, apparatus, electronic device, and storage medium.

BACKGROUND

An engine is a core component for developing program or system on an electronic platform. Using the engine, developers can quickly build, lay out functions required by a program, or use it to assist the operation of the program. Depending on different functions, the engine may include a game engine, a special effect engine, and the like.

Formats of resource files of the engine are mostly designed for runtime. In order to keep the package size as small as possible, the learning and editing costs for developers are relatively high. Therefore, the editor end has added unique file formats (for example material) for the editor or used other third-party file formats, for example, FBX (model format), PNG (picture format), etc. for some of resource files that need to be frequently edited by users.

SUMMARY

The present application provides a resource file loading method, apparatus, electronic device and storage medium.

According to a first aspect of the present application, there is provided a resource file loading method, comprising: acquiring an editable first resource file, and storing the first resource file and cached data of the first resource file; wherein the cached data is un-editable, and the file size of the cached data is smaller than that of the first resource file; in response to a loading instruction for the first resource file, determining whether the first resource file has changed; if the first resource file has not changed, acquiring the cached data of the first resource file, and loading the cached data of the first resource file; and if the first resource file has changed, acquiring the first resource file, and loading the first resource file.

Optionally, the method further comprises: generating ID information corresponding to the first resource file according to the first resource file, and storing the ID information corresponding to the first resource file; the determining whether the first resource file has changed includes: acquiring the first resource file, and generating current ID information of the first resource file according to the first resource file; if the current ID information is not equal to the ID information, determining that the first resource file has changed; if the current ID information is equal to the ID information, determining that the first resource file has not changed.

Optionally, the method further comprises: if the first resource file has changed, updating the stored ID information to the current ID information; updating the stored cached data to current cached data of the first resource file.

Optionally, storing the first resource file and the cached data of the first resource file includes: storing the first resource file in a first directory; and storing the cached data of the first resource file in a second directory.

Optionally, the method further comprises: acquiring a second resource file, and storing the second resource file; wherein the second resource file is un-editable; and in response to a load operation for the second resource file, loading the second resource file.

Optionally, the data type of the cached data of the first resource file is the same as that of the second resource file.

Optionally, the generating ID information corresponding to the first resource file according to the first resource file includes: performing hash calculation on the first resource file to obtain a hash value of the first resource file; and determining the hash value as the ID information corresponding to the first resource file.

According to a second aspect of the present application, there is provided a resource file loading apparatus, comprising: a first storage module configured to acquire an editable first resource file, and store the first resource file and cached data of the first resource file; wherein the cached data is un-editable, and the file size of the cached data is smaller than that of the first resource file; a resource file determination module configured to determine whether the first resource file has changed in response to a loading instruction for the first resource file; a cached data loading module configured to acquire the cached data of the first resource file and load the cached data of the first resource file if the first resource file has not changed; and a first resource file loading module configured to acquire the first resource file and load the first resource file if the first resource file has changed.

Optionally, the resource file loading apparatus further comprises: a ID information storage module configured to generate ID information corresponding to the first resource file according to the first resource file, and store the ID information corresponding to the first resource file; the resource file determination module is specifically configured to acquire the first resource file in response to a loading instruction for the first resource file, and generate current ID information of the first resource file according to the first resource file; if the current ID information is not equal to the ID information, determine that the first resource file has changed; if the current ID information is equal to the ID information, determine that the first resource file has not changed.

Optionally, the resource file loading apparatus further comprises: an ID information updating module configured to update the stored ID information to the current ID information if the first resource file has changed; and a cached data updating module configured to update the stored cached data to the current cached data of the first resource file.

Optionally, the first storage module is specifically configured to acquire an editable first resource file, store the first resource file in a first directory, and store the cached data of the first resource file in a second directory.

Optionally, the resource file loading apparatus further comprises: a second storage module configured to acquire a second resource file and store the second resource file; wherein the second resource file is un-editable; and a second resource file loading module configured to load the second resource file in response to a loading operation for the second resource file.

Optionally, the data type of the cached data of the first resource file is the same as that of the second resource file.

Optionally, the ID information storage module is specifically configured to perform hash calculation on the first resource file to obtain a hash value of the first resource file; determine the hash value as ID information corresponding to the first resource file, and store the ID information corresponding to the first resource file.

According to a third aspect of the present application, there is provided an electronic device, comprising: a processor configured to execute a computer program stored in a memory, wherein the computer program, when executed by the processor, implements the method of the first aspect.

According to a fourth aspect of the present application, there is provided a computer-readable storage medium with a computer program stored thereon, which, when executed by a processor, implements the method of the first aspect.

According to a fifth aspect of the present application, there is provided a computer program product, which, when runs on a computer, causes the computer to perform the method of the first aspect.

BRIEF DESCRIPTION OF THE DRAWINGS

The accompanying drawings, which are incorporated herein and constitute a part of this specification, illustrate embodiments consistent with the application and used to explain the principles of the application together with the specification.

In order to more clearly illustrate technical solutions in the embodiments of the present application or the prior art, the accompanying drawings that need to be used in the description of the embodiments or the prior art will be introduced briefly follow. Apparently, for those of ordinary skill in the art, other drawings can also be obtained from these drawings without any creative effort.

DETAILED DESCRIPTION

In order to more clearly understand above objects, features and advantages of the present application, the solution of the present application will be further described below. It should be noted that embodiments of the present application and features in the embodiments may be combined with each other without conflict.

Many specific details are set forth in the following description to facilitate a full understanding of the present application, but the present application can also be implemented in other ways different from those described herein; obviously, the embodiments in the specification are only a part, not all, of embodiments of the present application. With the development of the Internet, more and more users share their work and life via videos. Developers of video platforms can generate special effects for users to use through a special effect editing tool (i.e. editor). In this way, users can add some special effects in the process of making videos, to increase enjoyments of the videos.

Developers can generate sticker animations through a special effect editing tool, and provide those sticker animations to video platforms. For example, by calling a certain material (for example, plush, smooth, or others), and after cropping, adding stickers, animations and rendering, a sticker animation is generated. When shooting an image or video, a user can select a sticker animation that the user is interested in. After the user has selected the sticker animation, a video platform can add the sticker animation to an appropriate location through face detection to generate image data or video data containing the sticker animation. Wherein, the sticker animation is a kind of resource file, the format of which is a unique file format for the editor.

Alternatively, other third-party resource files can also be used. File formats of the third-party resource files include FBX (model format), PNG (picture format), and the like. Wherein, FBX is the Kaydara FiLMBOX file format. Kaydara FiLMBOX is a system for creating, editing and mixing motion capture and keyframe animations, usually a motion log file called in 3Dmax.

For the file format unique to the editor or the third-party file format, since they are different from the file format of the engine itself, the editor needs to parse the resource file when loading it and convert it into the resource of the engine. Although it is more beneficial for users to use, it takes more time when loading resource files and the loading efficiency is low because more editing information needs to be stored and has inconsistent file format with that of the engine itself. Therefore, Loading efficiency is low. In order to solve this problem, embodiments of the present application provide a resource file loading method, apparatus, electronic device, medium and program product, so as to improve the efficiency for loading resource files.

Figure 1:
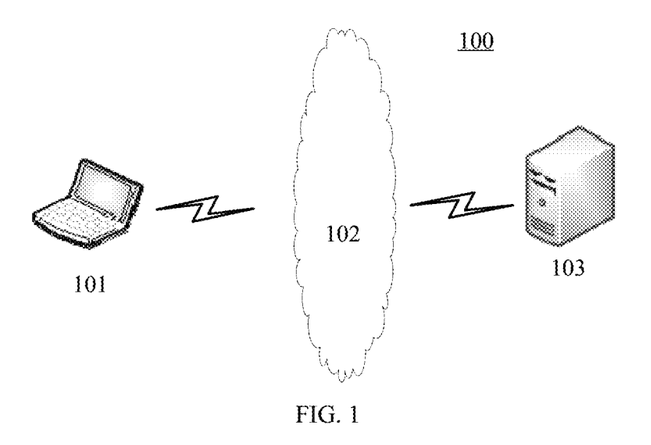
FIG. 1 illustrates a schematic diagram of a system architecture of an exemplary application environment that can be applied to a resource file loading method according to an embodiment of the present application.

Referring to FIG. 1, FIG. 1 illustrates a schematic diagram of a system architecture of an exemplary application environment that can be applied to a resource file loading method according to an embodiment of the present application. The system architecture 100 comprises: a terminal device 101, a network 102 and a server 103. The network 102 is a medium used to provide a communication link between the terminal device 101 and the server 103. The network 102 may include various connection types, for example, wired, wireless communication links, or fiber optic cables, among others. The terminal device 101 includes, but not limited to, a desktop computer, a portable computer, a smart phone, a tablet, and the like. It should be understood that the numbers of terminal devices, networks and servers in FIG. 1 are only illustrative. There can be any number of terminal devices, networks and servers according to implementation needs. For example, the server 103 may be a server cluster composed of a plurality of servers, or the like.

The resource file loading method provided in the embodiment of the present application may be executed by the terminal device 101, and correspondingly, the resource file loading apparatus may be provided in the terminal device 101. As an example, a developer can acquire a first resource file of a special effect engine through the terminal device 101, and a user can edit the first resource file through an editor in the terminal device 101. If the developer does not edit the first resource file, the first resource file and cached data of the first resource file may be stored locally. When the first resource file is to be loaded, in a case that the first resource file has not changed, the cached data of the first resource file can be loaded preferentially, which can improve the loading efficiency. After the loading is completed, corresponding sticker animation can be generated, and the sticker animation can be uploaded to the server 103 for users to use.

Figure 2:
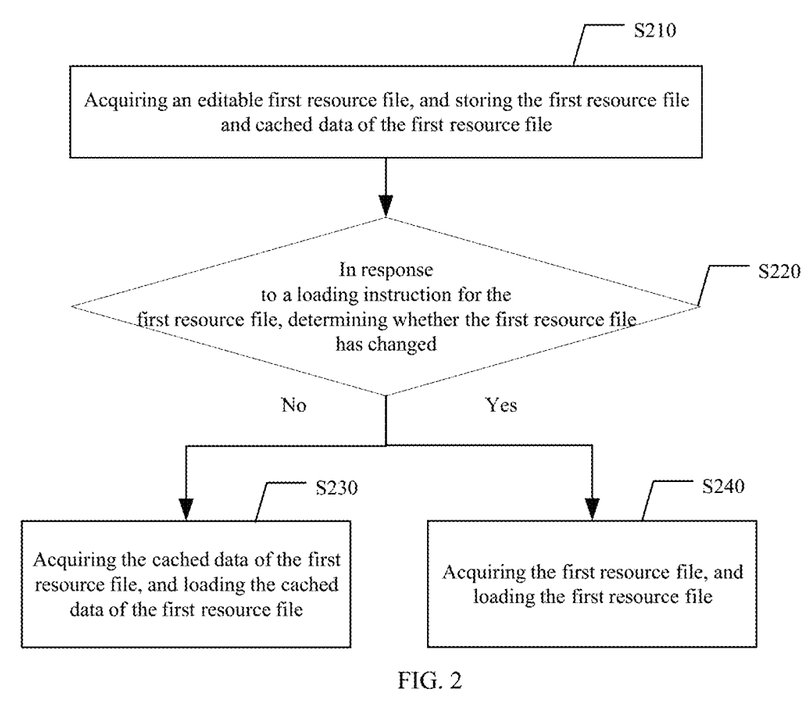
FIG. 2 is a flowchart of a resource file loading method in an embodiment of the present application.

Referring to FIG. 2, FIG. 2 is a flowchart of a resource file loading method in an embodiment of the present application, which may include following steps.

At step S210, acquiring an editable first resource file, and storing the first resource file and cached data of the first resource file.

The first resource file refers to a resource file of an engine (for example, a game engine, a special effect engine, etc.), and the first resource file is editable. Developers can edit and modify the first resource file during development to meet different development requirements. The first resource file may be a resource file generated by an editor, or a resource file generated by other third-party tools. Since the first resource file is editable, while the resource file of the engine is un-editable, the file format of the first resource file is different from that of the resource file of the engine. When the first resource file is stored, the cached data of the first resource file may be stored at the same time, and the cached data is also un-editable.

It should be noted that, since the first resource file can be edited and the cached data is un-editable, the cached data does not need to store much editing data and the cached data stores less data compared with the first resource file, and the file size of the cached data is smaller than that of the first resource file.

At step S220, in response to a loading instruction for the first resource file, determining whether the first resource file has changed.

When a developer wants to use the first resource file to generate the required sticker animation, a loading operation can be performed on the first resource file, and a corresponding loading instruction is generated at the same time. Since the first resource file is editable, when the first resource file is loaded, the developer may have or may not have modified the first resource file.

Based on this, after the terminal device responds to the loading instruction, it can first determine whether the first resource file has changed. If the first resource file has not changed, the content of the first resource file and the cached data are consistent, and step S230 can be executed; if the first resource file has changed, the content of the first resource file and the cached data are inconsistent, and step S240 can be executed.

At step S230, acquiring the cached data of the first resource file, and loading the cached data of the first resource file.

Since the cached data is un-editable, and the file size of the cached data is also smaller than that of the first resource file, when the first resource file is to be loaded, the cached data is loaded directly in the case that the first resource file has not changed, which can improve loading efficiency. In some embodiments, the format of the cached data may be the same as that of the resource file of the engine. In this way, when the file formats are the same, the loading speed is faster, so that loading efficiency can be further improved.

At step S240, acquiring the first resource file, and loading the first resource file.

In the case that the first resource file has changed, since the cached data has already being inconsistent with current content of the first resource file, loading the cached data directly will result in the updated first resource file not being used, which may not be conform to the developer's actual intention. Therefore, at this time, the first resource file can be acquired and loaded, so that the developer can use the latest content.

In the resource file loading method of the embodiment of the present application, for an editable first resource file, after acquiring the first resource file, the first resource file and the cached data of the first resource file can be stored at the same time. When loading the first resource file, it may be first determined whether the first resource file has changed, and if there is no change, the cached data of the first resource file is preferentially loaded. Since the cached data is un-editable, there is no need to store much editing data therein. Therefore, the file size of the cached data is smaller than that of the first resource file. Therefore, when the first resource file has not changed, loading efficiency can be improved by preferentially loading the cached data. If there is a change, it means that the developer has re-edited the first resource file, the cached data at this time is inconsistent with the first resource file, and the first resource file is loaded directly.

Figure 3:
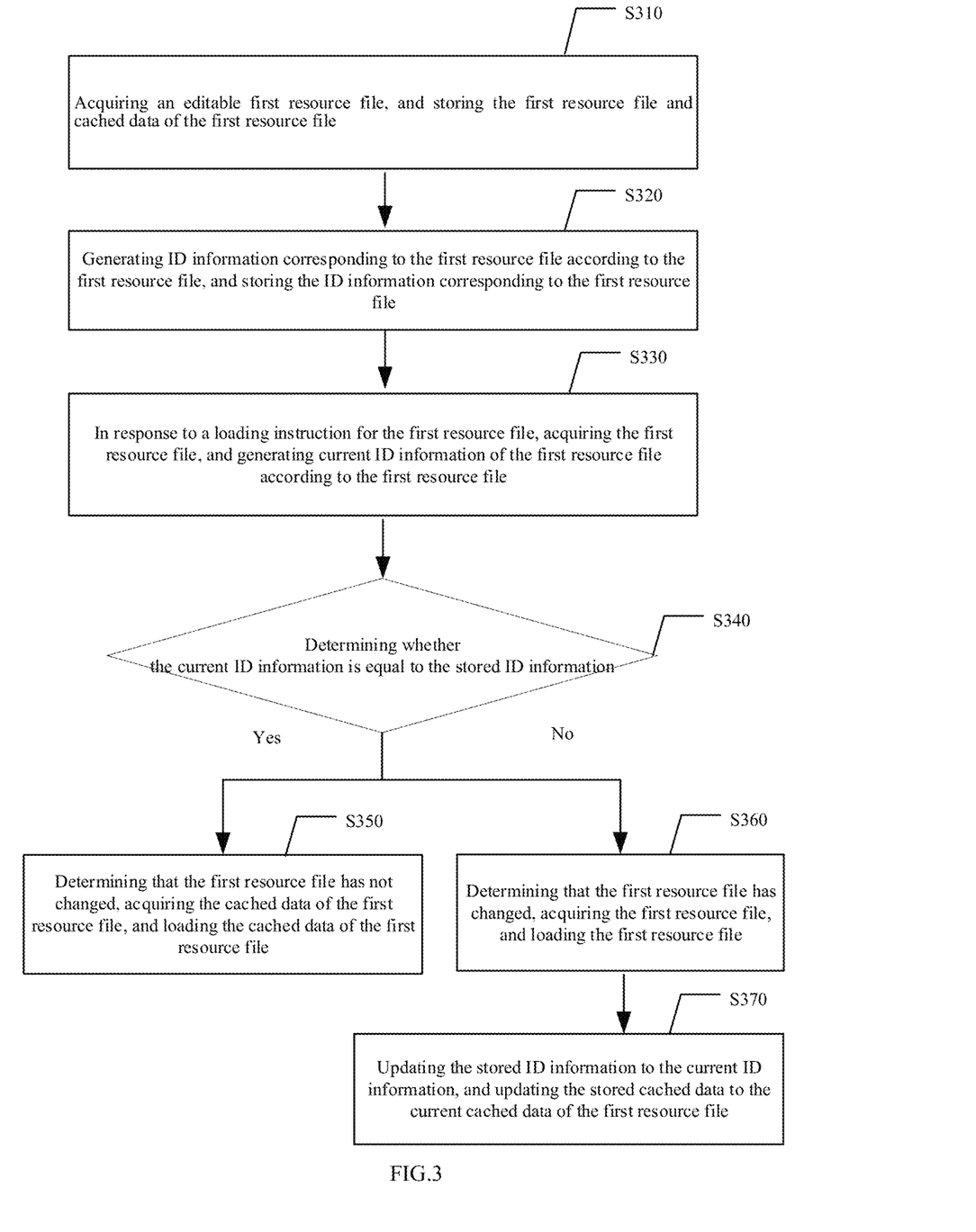
FIG. 3 is another flowchart of a resource file loading method in an embodiment of the present application.

Referring to FIG. 3, FIG. 3 is another flowchart of a resource file loading method in an embodiment of the present application, which may include following steps.

At step S310, acquiring an editable first resource file, and storing the first resource file and cached data of the first resource file. Wherein, the cached data is un-editable, and the file size of the cached data is smaller than that of the first resource file.

A root directory of a project loaded by an editor usually includes two resource-related folders, namely a first folder and a second folder, where the first folder is used to store resource files imported into the project by a user. A ResourceManager will monitor for changes under this folder and trigger an import job. Users can modify resource files from an editor resource inspector or directly from a file system. The second folder can save resource files of an engine, which are un-editable, for example, can save the resource files of the engine in a binary format.

Figure 4:
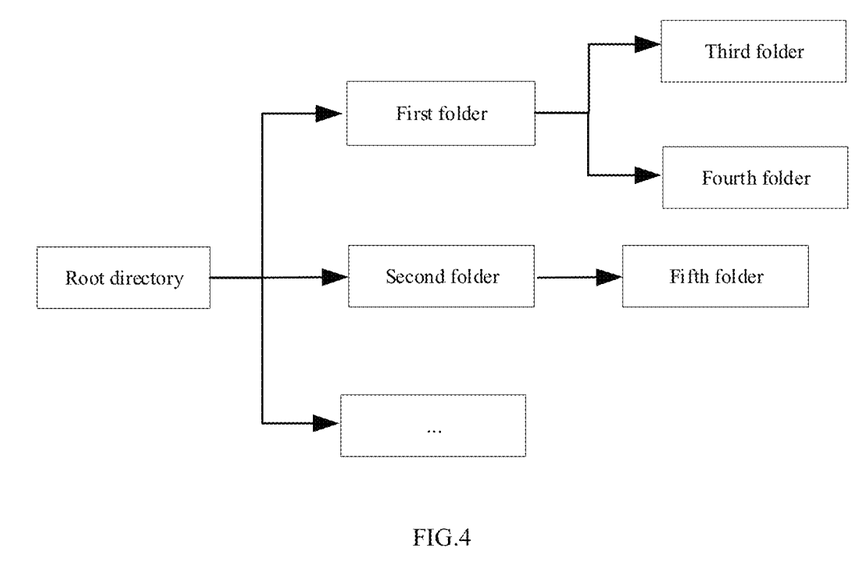
FIG. 4 is a schematic diagram of a directory of a project in an embodiment of the application.

Referring to FIG. 4, FIG. 4 is a schematic diagram of a directory of a project in an embodiment of the present application. The first folder may further include a third folder and a fourth folder, and the second folder may also include a fifth folder. Since the first resource file is editable and the cached data is un-editable, in some embodiments, the first resource file may be stored in a first directory; the cached data of the first resource file may be stored in a second directory. In this way, the editable first resource file and the un-editable cached data are stored separately, which can improve developing experiences of developers.

For example, for the directory shown in FIG. 4, the first resource file may be stored in the first folder, and the cached data may be stored in the second folder. In this way, when a developer edits the first resource file, he/she can directly enter the first folder to search for the first resource file, thereby improving query efficiency and further improving editing efficiency.

At Step S320, generating ID information corresponding to the first resource file according to the first resource file, and storing the ID information corresponding to the first resource file.

In an embodiment of the present application, for different first resource files, there is corresponding unique ID information, and the ID information may change with the change of the content in the first resource file. In this way, through the ID information, it can be determined whether the content of the first resource file has changed. In some embodiments, a hash calculation may be performed on the first resource file to obtain a hash value of the first resource file, and the hash value is determined as ID information corresponding to the first resource file. After the ID information corresponding to the first resource file is determined, the ID information may be stored in the second folder as un-editable data.

At step S330, in response to a loading instruction for the first resource file, acquiring the first resource file, and generating current ID information of the first resource file according to the first resource file.

In response to the loading instruction for the first resource file, the first resource file may be acquired from the first directory, since a developer may have or may not have modified the content in the first resource file, after acquiring the first resource file, ID information corresponding to the first resource file, that is, current ID information, can be regenerated according to the first resource file.

At step S340, determining whether the current ID information is equal to the stored ID information.

If the current ID information is equal to the stored ID information, step S350 may be performed; if the current ID information is not equal to the ID information, step S360 may be performed.

At step S350, determining that the first resource file has not changed, acquiring the cached data of the first resource file, and loading the cached data of the first resource file.

At step S360, determining that the first resource file has changed, acquiring the first resource file, and loading the first resource file.

Similar to above embodiment in FIG. 2, when the first resource file has not changed, the cached data is preferentially loaded to improve loading efficiency. When the first resource file has changed, the first resource file is loaded to use the latest content in the first resource file.

At step S370, updating the stored ID information to the current ID information, and updating the stored cached data to the current cached data of the first resource file.

When the first resource file has changed, the stored ID information and the cached data can also be updated in time, so that the ID information and the cached data correspond to the content in the first resource file. In this way, when the first resource file is loaded next time, if no further modification is made to the first resource file, the cached data can be loaded directly, so as to improve loading efficiency.

In an embodiment of the present application, a second resource file may also be acquired and stored. The second resource file refers to a resource file of the engine, which is un-editable. Optionally, the data type of the cached data of the first resource file is the same as that of the second resource file. For example, both the cached data of the first resource file and the second resource file may be binary data. In this way, the cached data of the first resource file is directly stored as the data type of the resource file of the engine, which can improve loading speed of the cached data.

Different from above storing the first resource file in the first folder, the second resource file may be stored in the second folder. In response to a loading operation for the second resource file, the second resource file is loaded, and loading speed of the second resource file is faster.

In the resource file loading method of the embodiment of the present application, for an editable first resource file, after acquiring the first resource file, the editable first resource file can be stored in the first directory, and the un-editable cached data and ID information are stored in the second directory. When a developer wants to modify the first resource file, he/she can directly search in the first directory, which can improve modification efficiency. When loading the first resource file, it may be first determined whether the first resource file has changed according to the ID information, and if the first resource file has not changed, the cached data of the first resource file is preferentially loaded. Since there is no need to store much editing data in the cached data, the file size of the cached data is smaller than that of the first resource file. For example, the cached data may be binary data. Therefore, when the first resource file has not changed, loading efficiency can be improved by preferentially loading the cached data. If the first resource file has changed, it means that the developer has re-edited the first resource file, the cached data at this time is inconsistent with the first resource file, and the first resource file is loaded directly to use the latest content.

Figure 5:
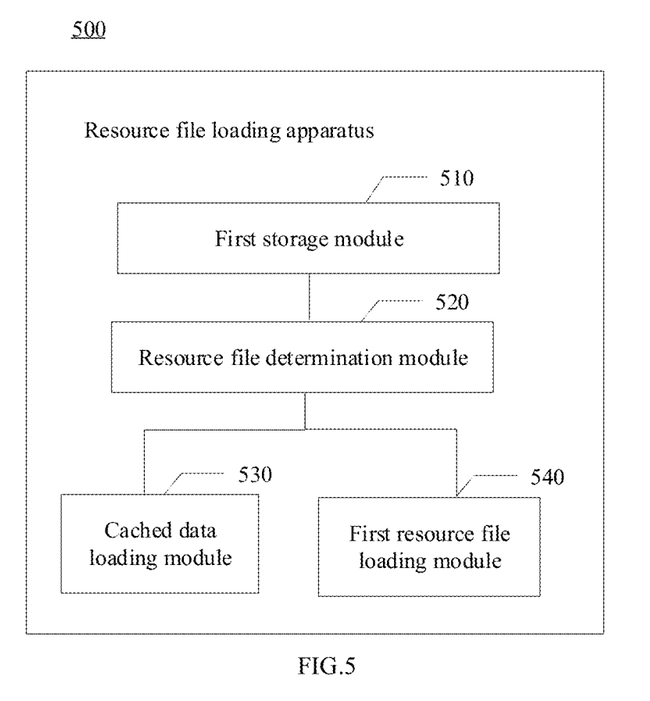
FIG. 5 is a schematic structural diagram of a resource file loading apparatus in an embodiment of the present application.

Corresponding to above method embodiments, an embodiment of the present application further provides a resource file loading apparatus. Referring to FIG. 5, the resource file loading apparatus 500 comprises: a first storage module 510 configured to acquire an editable first resource file, and store the first resource file and cached data of the first resource file; wherein the cached data is un-editable, and the file size of the cached data is smaller than that of the first resource file; a resource file determination module 520 configured to determine whether the first resource file has changed in response to a loading instruction for the first resource file; a cached data loading module 530 configured to acquire the cached data of the first resource file and load the cached data of the first resource file if the first resource file has not changed; and a first resource file loading module 540 configured to acquire the first resource file and load the first resource file if the first resource file has changed.

Optionally, the resource file loading apparatus 500 further comprises: an ID information storage module configured to generate ID information corresponding to the first resource file according to the first resource file, and store the ID information corresponding to the first resource file; The resource file determination module 520 is specifically configured to acquire the first resource file in response to the loading instruction for the first resource file, and generate current ID information of the first resource file according to the first resource file; if the current ID information is not equal to the ID information, determine that the first resource file has changed; if the current ID information is equal to the ID information, determine that the first resource file has not changed.

Optionally, the resource file loading apparatus 500 further comprises: an ID information updating module configured to update the stored ID information to the current ID information if the first resource file has changed; a cached data updating module configured to update the stored cached data to the current cached data of the first resource file.

Optionally, the first storage module 510 is specifically configured to acquire an editable first resource file, store the first resource file in a first directory, and store the cached data of the first resource file in a second directory.

Optionally, the resource file loading apparatus 500 further comprises: a second storage module configured to acquire a second resource file and store the second resource file; wherein the second resource file is un-editable; a second resource file loading module configured to load the second resource file in response to a loading operation for the second resource file.

Optionally, the data type of the cached data of the first resource file is the same as that of the second resource file.

Optionally, the ID information storage module is specifically configured to perform hash calculation on the first resource file to obtain a hash value of the first resource file; determine the hash value as ID information corresponding to the first resource file, and store the ID information corresponding to the first resource file.

Specific details of each module or unit in above apparatus have been described in detail in corresponding methods, and thus are not repeated here.

It should be noted that although several modules or units of a device for action performance are mentioned in detailed description hereinabove, this kind of division is not mandatory. Indeed, according to implementations of the present application, the features and functions of two or more modules or units described above may be embodied in one module or unit. Conversely, the features and functions of one module or unit described above may be further divided to be embodied by multiple modules or units.

In an exemplary embodiment of the present application, there is also provided an electronic device, comprising: a processor; a memory for storing instructions executable by the processor; wherein the processor is configured to execute above resource file loading method in the exemplary implementations.

Figure 6:
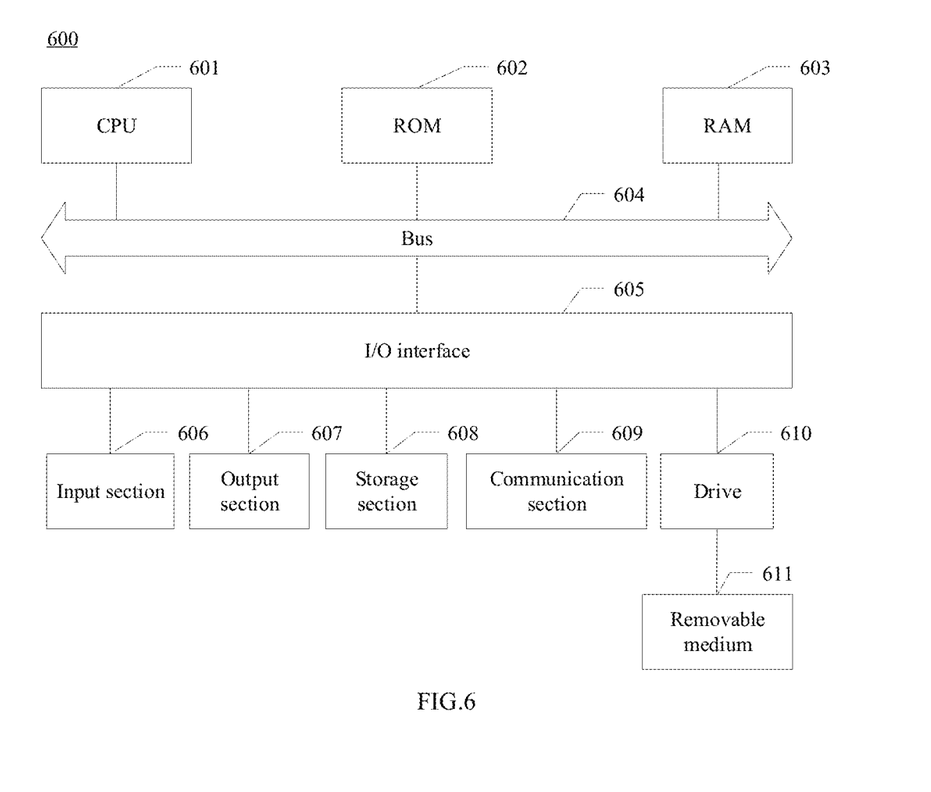
FIG. 6 is a schematic structural diagram of an electronic device in an embodiment of the present application.

FIG. 6 is a schematic structural diagram of an electronic device in an embodiment of the present application. It should be noted that the electronic device 600 shown in FIG. 6 is only one example, and should not impose any limitations on functions and scope of use of the embodiments of the present application.

As shown in FIG. 6, the electronic device 600 includes a central processing unit (CPU) 601 which can perform various appropriate actions and processes according to a program stored in a read only memory (ROM) 602 or a program loaded into a random access memory (RAM) 603 from a storage section 608. In the RAM 603, various programs and data necessary for system operations are also stored. The central processing unit 601, the ROM 602 and the RAM 603 are connected to each other via a bus 604. An input/output (I/O) interface 605 is also connected to bus 604.

The following components are connected to the I/O interface 605: an input section 606 including a keyboard, a mouse, etc.; an output section 607 including such as a cathode ray tube (CRT), a liquid crystal display (LCD), etc., and a speaker, etc.; a storage section 608 including a hard disk, etc.; and a communication section 609 including network interface cards such as local area network (LAN) cards, modems, and the like. The communication section 609 performs communication processing via a network such as the Internet. A drive 610 is also connected to the I/O interface 605 as needed. A removable medium 611, such as a magnetic disk, an optical disk, a magneto-optical disk, a semiconductor memory, etc., is mounted on the drive 610 as needed so that a computer program read therefrom is installed into the storage section 608 as needed.

In particular, according to an embodiment of the present application, the processes described above with reference to the flowcharts may be implemented as computer software programs. For example, an embodiment of the present application includes a computer program product comprising a computer program carried on a computer-readable medium, the computer program containing program code for performing the methods illustrated in the flowcharts. In such an embodiment, the computer program may be downloaded and installed from the network via the communication portion 609 and/or installed from the removable medium 611. When the computer program is executed by the central processing unit 601, various functions defined in the apparatus of the present application are performed.

In an embodiment of the present application, there is also provided a computer-readable storage medium, on which a computer program is stored, which, when executed by a processor, implement the above resource file loading method.

It should be noted that the computer-readable storage medium shown in the application can be, for example, but not limited to, an electrical, magnetic, optical, electromagnetic, infrared, or semiconductor system, apparatus or device, or any combination thereof. More specific examples of computer readable storage media may include, but not limited to, an electrical connection with one or more wires, a portable computer disk, a hard disk, a random access memory, a read only memory, an erasable programmable read only memory (EPROM or flash memory), an optical fiber, a portable compact disk read only memory (CD-ROM), an optical storage device, a magnetic storage device, or any suitable combination thereof. In this application, a computer-readable storage medium can be any tangible medium that contains or stores a program that can be used by or in conjunction with an instruction execution system, apparatus, or device. The program code contained on the computer-readable storage medium may be transmitted using any suitable medium, including but not limited to, wireless, wire, optical cable, Radio Frequency, etc., or any suitable combination thereof.

In an embodiment of the present application, there is also provided a computer program product, which, when run on a computer, causes the computer to execute above resource file loading method.

It should be noted that, in this document, relational terms such as "first" and "second" etc. are only used to distinguish one entity or operation from another entity or operation, and do not necessarily require or imply there is any such actual relationship or sequence between these entities or operations. Moreover, the terms "comprise", "include" or any other variations thereof are intended to encompass a non-exclusive inclusion such that a process, method, article or device that includes a range of elements comprises not only those elements, but also comprises other elements not explicitly listed, or elements inherent to such a process, method, article or device. Without further limitation, an element defined by the phrase "comprising one . . . " does not preclude the presence of additional identical elements in the process, method, article or device comprising the element.

Above descriptions are only specific implementations of the present application, to enable those skilled in the art to understand or implement the present application. Various modifications to these embodiments will be readily apparent to those skilled in the art, and the generic principles defined herein may be implemented in other embodiments without departing from the spirit or scope of the present application. Therefore, this application is not intended to be limited to the embodiments described herein, but is to be accorded the widest scope consistent with the principles and novel features disclosed herein.

What is claimed is:

1. A resource file loading method, comprising:
   acquiring an editable first resource file, and storing the first resource file and cached data of the first resource file; wherein the cached data is un-editable, and a file size of the cached data is smaller than that of the first resource file, and the cached data has the same file format or data type as that of a resource file of an engine for loading;
   in response to a loading instruction for the first resource file, determining whether the first resource file has changed;

if the first resource file has not changed, acquiring the cached data of the first resource file, and loading the cached data of the first resource file; and if the first resource file has changed, acquiring the first resource file, and loading the first resource file.

2. The method according to claim 1, further comprising:
generating identification information corresponding to the first resource file according to the first resource file, and storing the identification information corresponding to the first resource file;
wherein the determining whether the first resource file has changed includes:
acquiring the first resource file, and generating current identification information of the first resource file according to the first resource file;
if the current identification information is not equal to the identification information, determining that the first resource file has changed; and
if the current identification information is equal to the identification information, determining that the first resource file has not changed.

3. The method according to claim 2, further comprising:
if the first resource file has changed, updating the stored identification information to the current identification information; and
updating the stored cached data to current cached data of the first resource file.

4. The method according to claim 1, wherein the storing the first resource file and the cached data of the first resource file includes:
storing the first resource file in a first directory; and
storing the cached data of the first resource file in a second directory.

5. The method according to claim 1, further comprising:
acquiring a second resource file, and storing the second resource file; wherein the second resource file is un-editable; and
in response to a load operation for the second resource file, loading the second resource file.

6. The method according to claim 5, wherein a data type of the cached data of the first resource file is the same as that of the second resource file.

7. The method according to claim 2, wherein the generating identification information corresponding to the first resource file according to the first resource file includes:
performing hash calculation on the first resource file to obtain a hash value of the first resource file; and
determining the hash value as the identification information corresponding to the first resource file.

8. An electronic device, comprising: a processor configured to execute a computer program stored in a memory, wherein the computer program, when executed by the processor, causes the processor to:
acquire an editable first resource file, and store the first resource file and cached data of the first resource file; wherein the cached data is un-editable, and a file size of the cached data is smaller than that of the first resource file, and the cached data has the same file format or data type as that of a resource file of an engine for loading;
in response to a loading instruction for the first resource file, determine whether the first resource file has changed;
if the first resource file has not changed, acquire the cached data of the first resource file, and load the cached data of the first resource file; and if the first resource file has changed, acquire the first resource file, and load the first resource file.

9. The electronic device according to claim 8, wherein the computer program further causes the processor to:
generate identification information corresponding to the first resource file according to the first resource file, and store the identification information corresponding to the first resource file;
wherein the computer program causes the processor to determine whether the first resource file has changed by causing the processor to:
acquire the first resource file, and generate current identification information of the first resource file according to the first resource file;
if the current identification information is not equal to the identification information, determine that the first resource file has changed; and
if the current identification information is equal to the identification information, determine that the first resource file has not changed.

10. The electronic device according to claim 9, wherein the computer program further causes the processor to:
if the first resource file has changed, update the stored identification information to the current identification information; and
update the stored cached data to current cached data of the first resource file.

11. The electronic device according to claim 8, wherein the computer program causes the processor to store the first resource file and the cached data of the first resource file by causing the processor to:
store the first resource file in a first directory; and
store the cached data of the first resource file in a second directory.

12. The electronic device according to claim 8, wherein the computer program further causes the processor to:
acquire a second resource file, and store the second resource file; wherein the second resource file is un-editable; and
in response to a load operation for the second resource file, load the second resource file.

13. The electronic device according to claim 12, wherein a data type of the cached data of the first resource file is the same as that of the second resource file.

14. The electronic device according to claim 10, wherein the computer program causes the processor to generate identification information corresponding to the first resource file according to the first resource file by causing the processor to:
perform hash calculation on the first resource file to obtain a hash value of the first resource file; and
determine the hash value as the identification information corresponding to the first resource file.

15. A non-transitory computer-readable storage medium with a computer program stored thereon, which, when executed by a processor, causes the processor to:
acquire an editable first resource file, and store the first resource file and cached data of the first resource file; wherein the cached data is un-editable, and a file size of the cached data is smaller than that of the first resource file, and the cached data has the same file format or data type as that of a resource file of an engine for loading;
in response to a loading instruction for the first resource file, determine whether the first resource file has changed;

if the first resource file has not changed, acquire the cached data of the first resource file, and load the cached data of the first resource file; and if the first resource file has changed, acquire the first resource file, and load the first resource file.

16. The non-transitory computer-readable storage medium according to claim 15, wherein the computer program further causes the processor to:

generate identification information corresponding to the first resource file according to the first resource file, and store the identification information corresponding to the first resource file;

wherein the computer program causes the processor to determine whether the first resource file has changed by causing the processor to:

acquire the first resource file, and generate current identification information of the first resource file according to the first resource file;

if the current identification information is not equal to the identification information, determine that the first resource file has changed; and if the current identification information is equal to the identification information, determine that the first resource file has not changed.

17. The non-transitory computer-readable storage medium according to claim 16, wherein the computer program further causes the processor to:

if the first resource file has changed, update the stored identification information to the current identification information; and update the stored cached data to current cached data of the first resource file.

18. The non-transitory computer-readable storage medium according to claim 15, wherein the computer program causes the processor to store the first resource file and the cached data of the first resource file by causing the processor to:

store the first resource file in a first directory; and store the cached data of the first resource file in a second directory.

19. The non-transitory computer-readable storage medium according to claim 15, wherein the computer program further causes the processor to:

acquire a second resource file, and store the second resource file; wherein the second resource file is un-editable; and in response to a load operation for the second resource file, load the second resource file.

20. The non-transitory computer-readable storage medium according to claim 19, wherein a data type of the cached data of the first resource file is the same as that of the second resource file.

* * * * *